(12) United States Patent
Morimoto et al.

(10) Patent No.: US 12,183,958 B2
(45) Date of Patent: Dec. 31, 2024

(54) ENERGY MANAGEMENT SYSTEM

(71) Applicant: DENSO CORPORATION, Kariya (JP)

(72) Inventors: Youhei Morimoto, Kariya (JP);
Shigekazu Hidaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 357 days.

(21) Appl. No.: 17/567,292

(22) Filed: Jan. 3, 2022

(65) Prior Publication Data

US 2022/0123338 A1     Apr. 21, 2022

Related U.S. Application Data

(63) Continuation of application No. PCT/JP2020/023433, filed on Jun. 15, 2020.

(30) Foreign Application Priority Data

Jul. 2, 2019   (JP) .................................. 2019-123665

(51) Int. Cl.
*H01M 8/0656* (2016.01)
*H01M 8/0668* (2016.01)

(52) U.S. Cl.
CPC ....... *H01M 8/0656* (2013.01); *H01M 8/0668* (2013.01)

(58) Field of Classification Search
None
See application file for complete search history.

(56) References Cited

U.S. PATENT DOCUMENTS 11,383,977 B1 *  7/2022  Umealu .................... C01B 3/12
11,512,403 B2 *  11/2022 Kuhl ...................... C25B 15/081
(Continued)

FOREIGN PATENT DOCUMENTS

| CN | 105845962 A | 8/2016 |
| EP | 3 054 519 A1 | 8/2016 |

(Continued)

OTHER PUBLICATIONS

Sep. 8, 2020 International Search Report issued in International Application No. PCT/JP2020/023433.

*Primary Examiner* — Kevin M Bernatz
(74) *Attorney, Agent, or Firm* — Oliff PLC (57) ABSTRACT

An energy management system is provided with a fuel synthesizing apparatus, a power generation apparatus, a $CO_2$ recovering unit, a compressor, a $CO_2$ storage unit, a $CO_2$ pressure reducing unit and a heat recovery unit. The fuel synthesizing apparatus generates hydrocarbon from $H_2O$ and $CO_2$ using externally supplied power. The power generation apparatus generates power using the hydrocarbon. The $CO_2$ recovering unit recovers $CO_2$ from an exhaust gas exhausted from the power generation apparatus during a power generation. The compressor compresses the recovered $CO_2$. The $CO_2$ storage unit stores the $CO_2$ compressed by the compressor. The $CO_2$ pressure reducing unit depressurizes the $CO_2$ stored in the $CO_2$ storage unit in order to supply the fuel synthesizing apparatus therewith. The heat recovery unit recovers heat from the $CO_2$, the heat having been stored in the $CO_2$ when compressed or depressurized.

9 Claims, 5 Drawing Sheets

(56) References Cited

U.S. PATENT DOCUMENTS

| | | | |
|---|---|---|---|
| 2004/0191598 A1* | 9/2004 | Gottmann | C25B 1/00 |
| | | | 429/418 |
| 2004/0202914 A1* | 10/2004 | Sridhar | H01M 8/04753 |
| | | | 429/411 |
| 2008/0138675 A1* | 6/2008 | Jang | C25B 1/02 |
| | | | 429/492 |
| 2010/0028734 A1* | 2/2010 | Ballantine | H01M 8/2495 |
| | | | 429/413 |
| 2010/0314235 A1* | 12/2010 | Varadaraj | C01B 3/384 |
| | | | 201/37 |
| 2011/0054047 A1* | 3/2011 | Severinsky | C01B 3/16 |
| | | | 422/186 |
| 2012/0096865 A1 | 4/2012 | Murakami et al. | |
| 2013/0137783 A1* | 5/2013 | Kumar | C01B 3/02 |
| | | | 422/621 |
| 2014/0194539 A1* | 7/2014 | Hammad | C25B 11/061 |
| | | | 422/186.04 |
| 2016/0017800 A1* | 1/2016 | Simpson | C25B 1/04 |
| | | | 422/162 |
| 2016/0097138 A1 | 4/2016 | Hammad et al. | |
| 2016/0226090 A1* | 8/2016 | Sone | C25B 1/00 |
| 2016/0248110 A1 | 8/2016 | Ghezel-Ayagh | |
| 2017/0271701 A1* | 9/2017 | Berlowitz | H01M 8/04805 |
| 2017/0279134 A1* | 9/2017 | Reytier | C25B 9/66 |
| 2018/0086985 A1 | 3/2018 | von Olshausen et al. | |
| 2018/0241060 A1* | 8/2018 | Harbusch | H01M 8/0606 |
| 2018/0261854 A1* | 9/2018 | Schrooten | H01M 8/2418 |
| 2018/0261860 A1* | 9/2018 | Jahnke | H01M 8/184 |
| 2018/0261862 A1* | 9/2018 | Jahnke | H01M 8/04007 |
| 2018/0261865 A1* | 9/2018 | Jahnke | B01D 53/326 |
| 2019/0185396 A1* | 6/2019 | Schulz | C25B 15/08 |
| 2019/0194816 A1* | 6/2019 | Brunot | C25B 9/73 |
| 2020/0087801 A1* | 3/2020 | Kurashina | C25B 1/04 |
| 2020/0251755 A1* | 8/2020 | Jahnke | H01M 8/04097 |
| 2020/0287224 A1* | 9/2020 | Jahnke | H01M 8/0625 |
| 2020/0328445 A1* | 10/2020 | Weingaertner | H01M 8/0612 |
| 2021/0005911 A1* | 1/2021 | Kim | H01M 8/0612 |
| 2021/0332488 A1* | 10/2021 | Sakai | C25B 9/77 |
| 2022/0064541 A1* | 3/2022 | Lyubovsky | B01D 3/007 |
| 2022/0077482 A1* | 3/2022 | Kawabata | C01B 32/05 |
| 2022/0119964 A1* | 4/2022 | Morimoto | C10L 3/08 |
| 2022/0181671 A1* | 6/2022 | Shinke | H01M 8/2484 |
| 2023/0202840 A1* | 6/2023 | Flanders | C25B 15/083 |
| | | | 252/373 |
| 2024/0258546 A1* | 8/2024 | Moore | H01M 8/04201 |

FOREIGN PATENT DOCUMENTS

| | | | | |
|---|---|---|---|---|
| GB | 2577380 A | * | 3/2020 | F01K 3/02 |
| JP | H07-90122 B2 | | 10/1995 | |
| JP | 2010-062192 A | | 3/2010 | |
| JP | 2018190650 A | * | 11/2018 | |
| WO | WO-2012069636 A2 | * | 5/2012 | C10G 2/00 |
| WO | 2014/107561 A1 | | 7/2014 | |
| WO | 2018/163416 A1 | | 9/2018 | |

\* cited by examiner

ENERGY MANAGEMENT SYSTEM

CROSS REFERENCE TO RELATED APPLICATION

This application is the U.S. bypass application of International Application No. PCT/JP2020/023433 filed on Jun. 15, 2020, which designated the U.S. and claims priority to Japanese Patent Application No. 2019-123665 filed on Jul. 2, 2019, the contents of both of these are incorporated herein by reference.

BACKGROUND

Technical Field

The present disclosure relates to an energy management system.

Description of the Related Art

An energy storage method is known. For example, a method is disclosed for storing energy by converting electric energy obtained by solar power generation or the like into chemical energy. According to this energy storage method, by reacting hydrogen obtained by electrolysis of water with carbon monoxide or carbon dioxide, dimethyl ether is synthesized and liquefied for storage. Then, the stored dimethyl ether is utilized to produce power.

SUMMARY

The energy management system according to the present disclosure is provided with a fuel synthesizing apparatus, a power generation apparatus, a $CO_2$ recovering unit, a compressor, a $CO_2$ storage unit, a $CO_2$ pressure reducing unit and a heat recovery unit.

DETAILED DESCRIPTION OF THE PREFERRED EMBODIMENTS

As a conventional art, Japanese Patent Application Laid-Open Publication No. 2010-62192 proposes a method for storing energy by converting electric energy obtained by solar power generation or the like into chemical energy. According to this energy storage method, by reacting hydrogen obtained by electrolysis of water with carbon monoxide or carbon dioxide, dimethyl ether is synthesized and liquefied for storage. Then, the stored dimethyl ether is utilized to produce power.

However, according to the storage method of the above-mentioned patent literature, efficiency of the whole system is not sufficient.

In light of the above-mentioned circumstances, the present disclosure provides an energy management system that improves a system efficiency in which electric energy is utilized to synthesize hydrocarbon, and generates power using the synthesized hydrocarbon.

Hereinafter, with reference to the drawings, an energy management system according to an embodiment of the present disclosure will be described.

Figure 1:
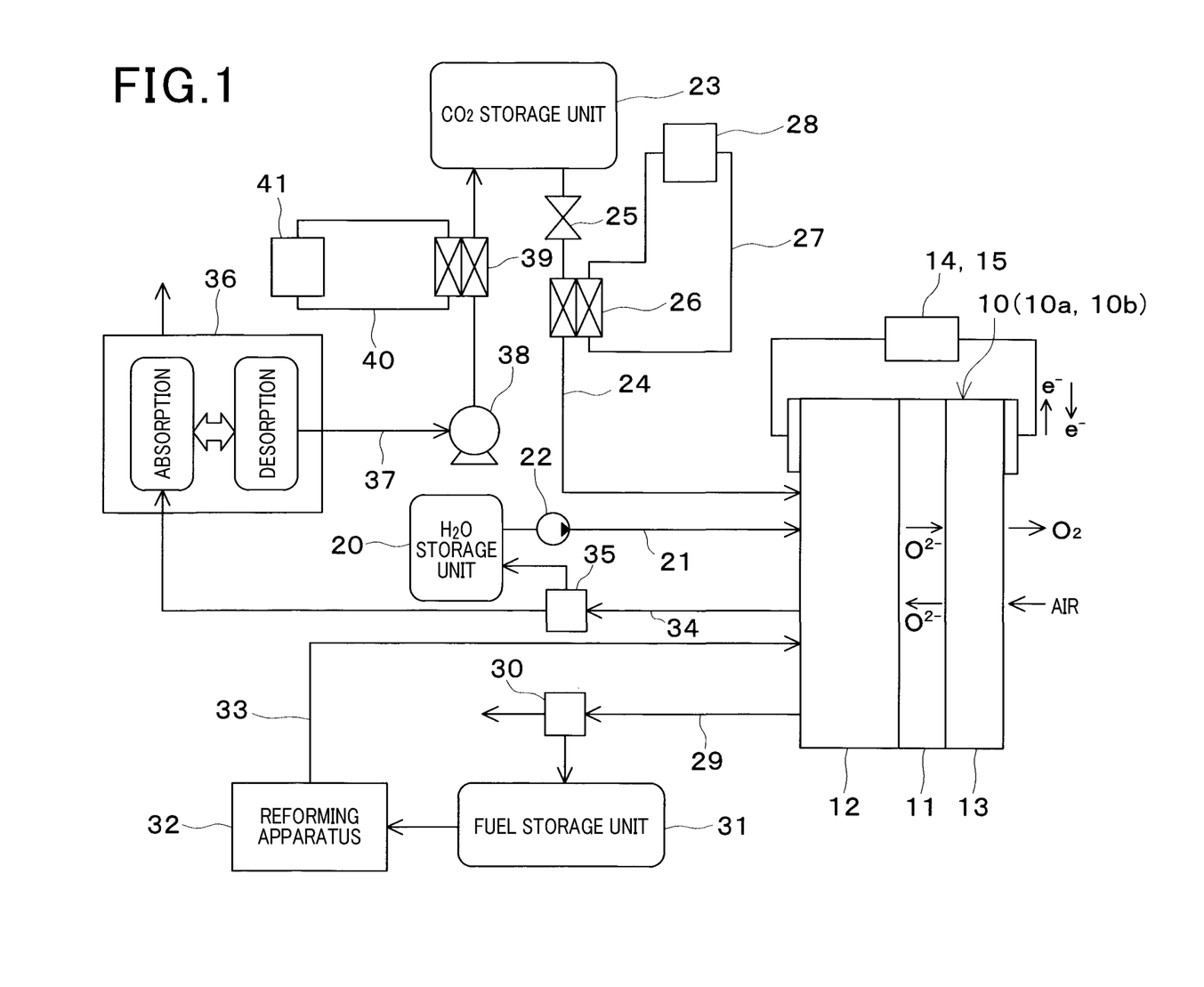
FIG. 1 is a diagram showing an overall configuration of an energy management system according to an embodiment of the present disclosure.

As shown in FIG. 1, the energy management system is provided with a fuel synthesizing generation apparatus 10. The fuel synthesizing generation apparatus 10 is configured to be capable of switching between the synthesizing operation of hydrocarbon using externally supplied power and a power generation operation using hydrocarbon. The fuel synthesizing generation apparatus 10 incudes a fuel synthesizing mode operating as a fuel synthesizing apparatus 10a and a power generation mode operating as a power generation apparatus 10b.

The fuel synthesizing apparatus 10a is configured as a solid oxide electrolytic cell (SOEC) and the power generation apparatus 10b is configured as a solid oxide fuel cell (SOFC). The fuel synthesizing apparatus 10a is able to electrolyze $H_2O$ and $CO_2$ and synthesize hydrocarbon using electrolyzed $H_2O$ and $CO_2$. The power generation apparatus 10b is able to generate power (electricity) using the hydrocarbon.

The fuel synthesizing generation apparatus 10 is provided with an electrolyte 11 and a pair of electrodes 12 and 13 provided at both sides of the electrolyte 11. The fuel synthesizing generation apparatus 10 shown in FIG. 1 is configured as a single cell disposed between the pair of electrodes 12 and 13, but may be configured as a stacked structure where a plurality of cells are stuck.

The electrolyte 11 is a solid material having oxygen ion conductivity and may be composed of $ZrO_2$ as a zirconia-based oxide, for example. The electrodes 12 and 13 is configured as cermet in which metal catalyst and ceramics are mixed and fired. For a first electrode 12, Ni and Co or the like are provided as a metal catalyst. Ni and Co serve as a catalyst to promote an electrolytic reaction between $CO_2$ and $H_2$ and a synthesizing reaction of hydrocarbon. For a second electrode 13, as a metal catalyst, Ni and Pt or the like are provided. Ni and Pt serves as a catalyst to promote a reaction where $O_2-$ is coupled with electron to generate $O_2$.

The electrodes 12 and 13 serve as anode or cathode. For these electrodes 12 and 13, anode and cathode are switched depending on the operation mode whether the fuel synthesizing generation apparatus 10 operates in a fuel synthesizing mode or a power generation mode. Specifically, when the fuel synthesizing generation apparatus 10 operates in the fuel synthesizing mode, the first electrode 12 serves as cathode, and the second electrode 13 serves as anode. When the fuel synthesizing generation apparatus 10 operates in the power generation mode, the first electrode 12 serves as anode and the second electrode 13 serves as cathode.

When the fuel synthesizing generation apparatus 10 operates in a fuel synthesizing mode, the power is supplied to the fuel synthesizing generation apparatus 10 from a power supply apparatus 14 as an external power source. According to the present embodiment, a power generation apparatus utilizing natural energy is the power supply apparatus 14. The power supply apparatus 14 can perform, for example, solar power generation.

When the fuel synthesizing generation apparatus 10 operates in the power generation mode, the power generated in the fuel synthesizing generation apparatus 10 is supplied to the power-consuming apparatus 15. The power-consuming apparatus 15 operates when the power is supplied thereto. The power-consuming apparatus 15, can be electrical equipment such as home electric appliances.

When the fuel synthesizing generation apparatus 10 operates in the fuel synthesizing mode, $H_2O$ and $CO_2$ are supplied to the fuel synthesizing generation apparatus 10. In the fuel synthesizing generation apparatus 10, $H_2$ is generated by electrolysis of $H_2O$ and CO is generated by electrolysis of $CO_2$.

$H_2O$ is supplied to the fuel synthesizing generation apparatus 10 from $H_2O$ storage unit 20 via the $H_2O$ supply passage 21. In the $H_2O$ storage unit 20 according to the present embodiment, $H_2O$ is stored in a liquid state. The $H_2O$ pump 22 that pumps $H_2O$ to the fuel synthesizing generation apparatus 10 is provided in the $H_2O$ supply passage 21. $H_2O$ may be supplied to the fuel synthesizing generation apparatus 10 in the liquid state. The $H_2O$ pump 22 operates based on a control signal from a control unit 50 which will be described later.

$CO_2$ is supplied to the fuel synthesizing generation apparatus 10 from a $CO_2$ storage unit 23 via the $CO_2$ supply passage 24. In the $CO_2$ storage unit 23 according to the present embodiment, $CO_2$ is stored in a liquid state. $CO_2$ stored in the $CO_2$ storage unit 23 is pressurized.

A pressure adjusting valve 25 is provided in the $CO_2$ supply passage 24. The pressure adjusting valve 25 serves as a $CO_2$ pressure reducing unit that depressurizes $CO_2$ stored in the $CO_2$ storage unit 23. The pressure adjusting valve 25 serves as an expansion valve for expanding $CO_2$. The pressure adjusting valve 25 operates based on the control signal transmitted from the control unit 50 which will be described later.

A first heat exchanger 26 is provided in a downstream side of the gas flow relative to the pressure adjusting valve 25 in the $CO_2$ supply passage 24. The first heat exchanger 26 is configured as an evaporator serving as a cooling heat exchanger.

The first heat exchanger 26 is capable of heat-exchange between $CO_2$ flowing through the $CO_2$ supply passage 24 and a heat transfer medium flowing through a first heat transfer medium circuit 27. $CO_2$ depressurized at the pressure adjusting valve 25 absorbs heat from the heat transfer medium flowing through the first heat transfer medium 27 and evaporates. In the first heat exchanger 26, the heat transfer medium is cooled by cold heat generated when $CO_2$ is evaporated. For the heat transfer medium, ethylene glycol solutions can be used. The first heat exchanger 26 serves as a heat recovery unit that recovers cold heat stored in $CO_2$ by the pressure reduction and expansion.

The heat transfer medium cooled by the first heat exchanger 26 is supplied to a cold utilizing unit 28 via a first heat transfer circuit 27. The cold utilizing unit 28 is an apparatus that utilizes cold heat generated when $CO_2$ is evaporated, and may be configured as a cooling unit performing indoor-cooling, for example.

When the fuel synthesizing generation apparatus 10 operates in the fuel synthesizing mode, hydrocarbon is synthesized from $H_2$ and CO generated by electrolysis. The synthesized hydrocarbon is exhausted from the fuel synthesizing generation apparatus 10 as a fuel synthesizing exhaust gas containing the synthesized hydrocarbon. The hydrocarbon contained in the fuel synthesizing exhaust gas is, for example, methane. The hydrocarbon is used as a fuel when the fuel synthesizing generation apparatus 10 operates in the power generation mode.

The fuel synthesizing exhaust gas passes through the fuel synthesizing exhaust gas passage 29. In the fuel synthesizing exhaust gas passage 29, a fuel separation unit 30 is provided. The fuel separation unit 30 separates hydrocarbon from the fuel synthesizing exhaust gas. The separation of hydrocarbon from the fuel synthesizing exhaust gas can be a distilled separation, for example.

The hydrocarbon separated from the fuel separation unit 30 is stored as a fuel in a fuel storage unit 31. The fuel storage unit 31 stores hydrocarbon in a liquid state.

When the fuel synthesizing generation apparatus 10 operates in the power generation mode, the fuel stored in the fuel storage unit 31 is supplied to a reforming apparatus 32. The reforming apparatus 32 generates $H_2$ and CO from hydrocarbon by a reforming reaction. The reforming apparatus 32 operates based on the control signal transmitted from the control unit 50 which will be described later. $H_2$ and CO generated in the reforming apparatus 32 is supplied to the fuel synthesizing apparatus 10 via a reforming fuel supply passage 33.

When the fuel synthesizing generation apparatus 10 operates in the power generation mode, a power generation exhaust gas containing $CO_2$ and $H_2O$ is exhausted from the fuel synthesizing generation apparatus 10. The power generation exhaust gas passes through the power generation exhaust gas passage 34. The power generation exhaust gas passes through the power generation exhaust gas passage 34.

In the power generation exhaust gas passage 34, a $H_2O$ separation unit 35 is provided. The $H_2O$ separation unit 35 is supplied with the power generation exhaust gas containing $CO_2$ and $H_2O$. The $H_2O$ separation unit 35 separates $H_2O$ from the power generation exhaust gas. For the $H_2O$ separation unit 35, for example, a gas-liquid separator can be used.

A $CO_2$ recovering unit 36 is provided in a downstream side of the gas flow relative to the $H_2O$ separation unit 35 in the power generation exhaust gas passage 34. The $CO_2$ recovering unit 36 is supplied with power generation exhaust gas. The $CO_2$ recovering unit 36 separates $CO_2$ from the power generation exhaust gas. The $CO_2$ recovering unit 36 according to the present embodiment repeatedly performs absorption and desorption of $CO_2$, thereby separating $CO_2$ from the power generation exhaust gas and recovering the $CO_2$.

The $CO_2$ recovered by the $CO_2$ recovering unit 36 is supplied to the $CO_2$ storage unit 23 via a $CO_2$ recovering passage 37. In the $CO_2$ recovering passage 37, a compressor 38 is provided. the compressor 38 operates based on the control signal transmitted from the control unit 50 which will be described later.

The $CO_2$ recovered by the $CO_2$ recovering unit 36 is compressed by the compressor 38 and supplied to the $CO_2$ storage unit 23. A second heat exchanger 39 is provided in a downstream side of the gas flow relative to the compressor 38 in the $CO_2$ recovering passage 37. The second heat exchanger 39 is a condenser serving as a heat exchanger for heating.

The second heat exchanger 39 is capable of exchanging between $CO_2$ flowing through the $CO_2$ recovering passage 37 and heat transfer medium flowing through the second heat transfer medium circuit 40. $CO_2$ compressed in the compressor 38 is radiated to the heat transfer medium flowing through the second heat transfer medium 40 and condensed. In the second heat exchanger 39, the heat transfer medium is heated by heat generated when $CO_2$ is condensed. For the heat transfer medium, for example, ethylene glycol solution can be used. The second heat exchanger 39 serves as a heat recovering unit that recovers heat stored in $CO_2$ by the compressing.

The heat transfer medium cooled by the second heat exchanger 39 is supplied to a heat utilizing unit 41 via the second heat transfer medium 40. The heat utilizing unit 41 utilizes heat generated when $CO_2$ is compressed.

The heat utilizing unit 41 can be configured as a heating apparatus that heats air used for an indoor air-conditioning with a heat recovered by the second heat exchanger 39. Alternatively, the heat utilizing unit 41 can be configured as a water heating apparatus in which water is heated by heat recovered by the second heat exchanger 39, thereby generating hot water.

Further, the heat utilizing unit 41 can be configured as a $H_2O$ heating apparatus that heats $H_2O$ to be supplied to the fuel synthesizing generation apparatus 10 from the $H_2O$ storage unit 20 with the heat recovered by the second heat exchanger 39. Thus, $H_2O$ as water vapor can be supplied to the fuel synthesizing apparatus 10.

Further, the heat utilizing unit 41 can be configured as a heating apparatus that heats the fuel synthesizing apparatus 10 with a heat recovered by the second heat exchanger 39. Thus, heat quantity required for a case where the fuel synthesizing generation apparatus 10 operates in the fuel synthesizing mode or the power generation mode can be supplemented.

Figure 2:
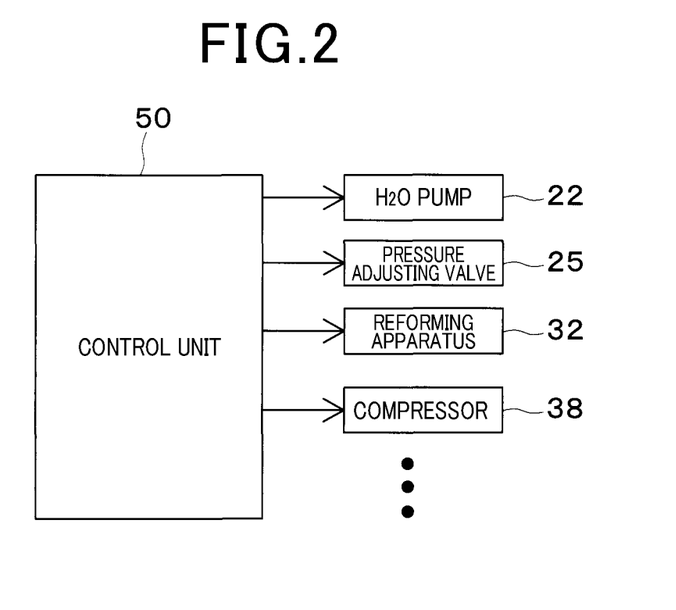
FIG. 2 is a block diagram of a control unit.

Also, the heat utilizing unit 41 can be configured as a heating apparatus that heats the reforming apparatus 32 with heat recovered by the second exchanger. Thus, the heat quantity required for the reforming reaction in the reforming apparatus 32 can be supplemented As shown in FIG. 2, the energy management system is provided with a control unit 50. The control unit 50 is configured of a known microcomputer including CPU, ROM, RAM and the like, and peripheral circuit thereof. The control unit 50 performs various calculations and processing based on an air conditioning control program stored in the ROM, and controls operations of various control object equipment 22, 25, 32 and 38 connected to the output side thereof. For an input side of the control unit 50, various sensors and the like which are not shown are connected.

Next, an operation of an energy management system according to the present embodiment will be described.

Figure 3:
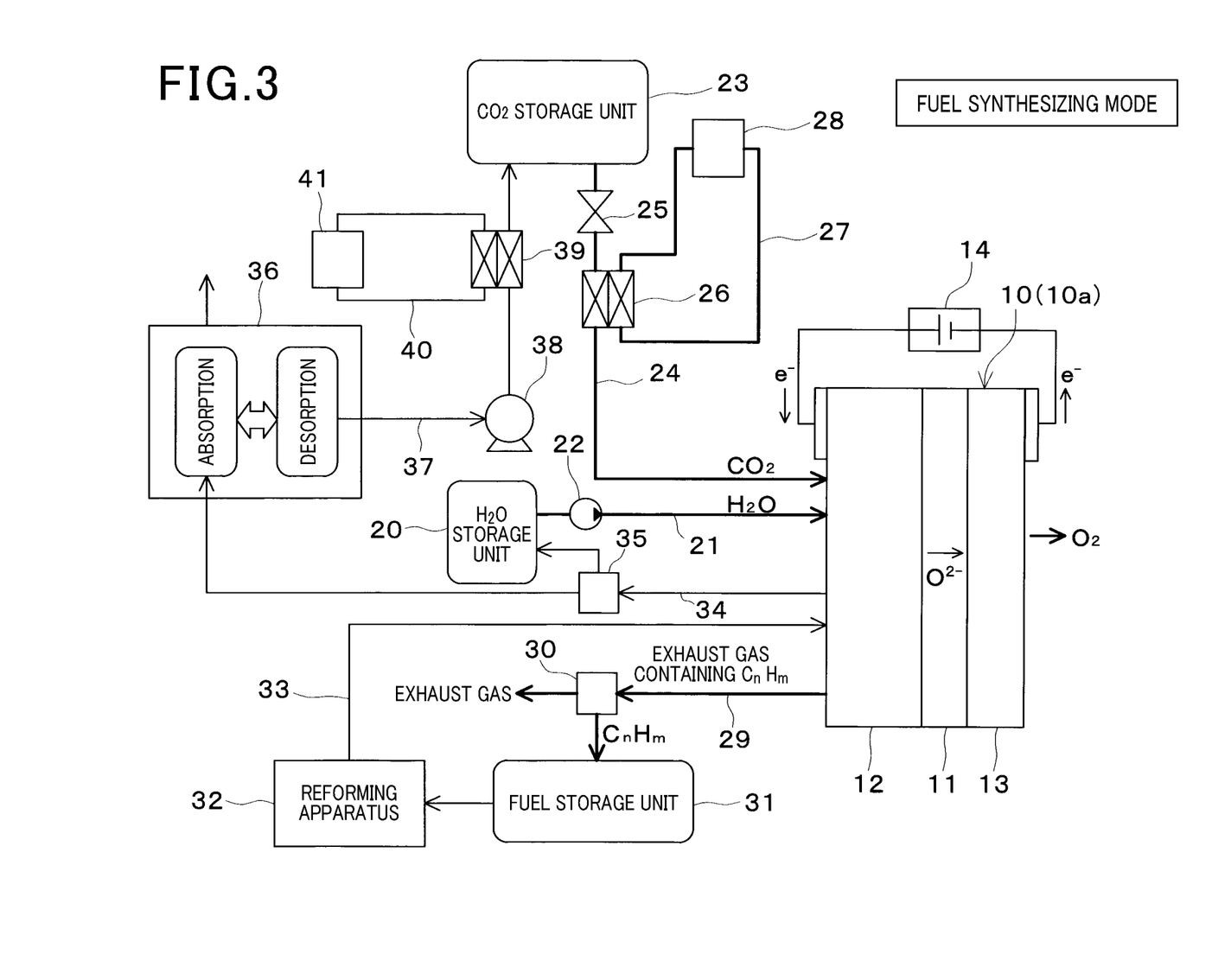
FIG. 3 is a diagram showing an energy management system in a fuel synthesizing mode.

With reference to FIG. 3, the fuel synthesizing mode will be described. The fuel synthesizing generation apparatus 10 operates as a fuel synthesizing apparatus 10a. In the fuel synthesizing mode, the power is supplied to the fuel synthesizing generation apparatus 10 from the power supply apparatus 14.

In the fuel synthesizing mode, $H_2O$ and $CO_2$ are supplied to the first electrode 12 of the fuel synthesizing generation apparatus 10. $H_2O$ stored in the $H_2O$ storage unit 20 is supplied to the fuel synthesizing generation apparatus 10 by activating the $H_2O$ pump 22. $CO_2$ stored in the $CO_2$ storage unit 23 is supplied to the fuel synthesizing apparatus 10 by opening the pressure adjusting valve 25.

The $CO_2$ depressurized at the pressure adjusting valve 25 evaporates at the first heat exchanger 26, and heat transfer medium flowing through the first heat transfer medium circuit 27 is cooled by vaporized latent heat thereof. The heat transfer medium cooled at the first heat exchanger 26 is supplied to the cold utilizing unit 28 via the first heat transfer circuit 27. The cold heat generated by pressure reduction and expansion of $CO_2$ is utilized by the cold utilizing unit 28.

In the fuel synthesizing mode, the first electrode 12 of the fuel synthesizing generation apparatus 10 serves as a cathode and the following reactions occur.

(Electrolyte Reaction)

$$H_2O + 2e^- \rightarrow H_2 + O^{2-}$$

$$CO_2 + 2e^- \rightarrow CO + O^{2-}$$

(Fuel Synthesizing Reaction)

$$3H_2 + CO \rightarrow CH_4 + H_2O$$

The electrolyte reaction is co-electrolysis reaction in which $H_2O$ and $CO_2$ are simultaneously electrolyzed. According to the fuel synthesizing reaction of the present embodiment, $CH_4$ is synthesized as hydrocarbon. $O^{2-}$ generated in the electrolyte reaction of the first electrode 12 propagates through the electrolyte 11 and reaches the second electrode 13. In the fuel synthesizing mode, the second electrode 13 serves as an anode in which $O^{2-}$ and electron are coupled to generate $O_2$.

In the fuel synthesizing reaction, $CH_4$ is synthesized from $H_2$ and CO which are generated with the electrolyte reaction. $CH_4$ generated at the first electrode 12 is exhausted as the fuel synthesizing exhaust gas from the fuel synthesizing generation apparatus 10 via the synthesizing exhaust gas passage 29. $CH_4$ contained in the fuel synthesizing exhaust gas is separated at the fuel separation unit 30 and stored in the fuel storage as a hydrocarbon fuel. The fuel synthesizing exhaust gas remained after separation of $CH_4$ is exhausted outside.

Figure 4:
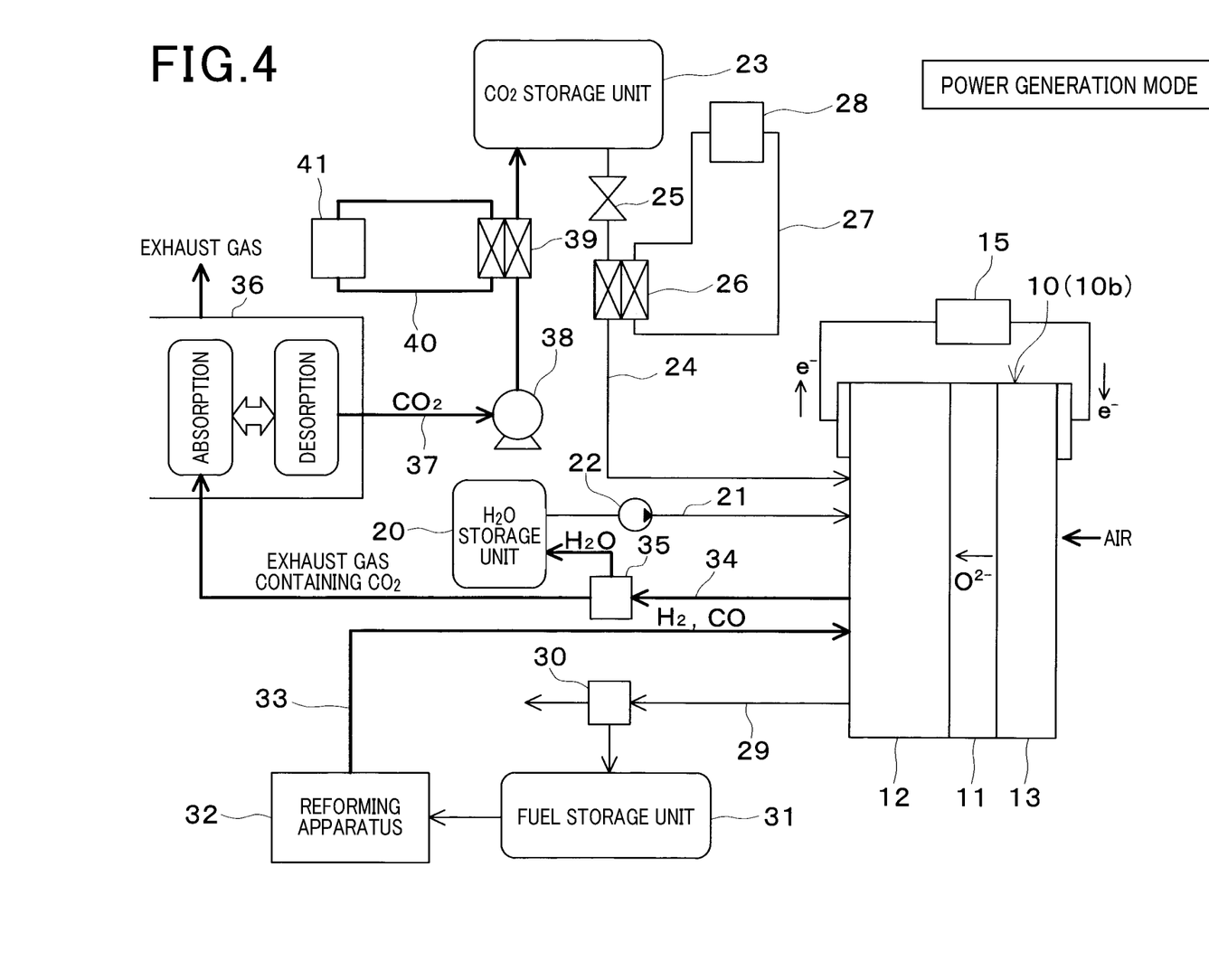
FIG. 4 is a diagram showing an energy management system in a power generation mode.

Next, with reference to FIG. 4, power generation mode will be described. In the power generation mode, the fuel synthesizing generation apparatus 10 operates as the power generation apparatus 10b. The power generated in the fuel synthesizing generation apparatus 10 is supplied to the power-consuming apparatus 15.

In the power generation mode, $H_2$ and CO are supplied to the first electrode 12 from the reforming apparatus 32. Further, air containing $O_2$ is supplied to the second electrode 13.

In the power generation mode, the second electrode 13 serves as a cathode, in which electron is separated from $O_2$ in the air to generate $O^{2-}$. $O^{2-}$ generated at the second electrode 13 propagates through the electrolyte 11 and reaches the first electrode 12.

In the power generation mode, the first electrode 12 serves as an anode and the following reactions occur.

$$H_2 + O^{2-} + 2e^- \rightarrow H_2O$$

$$CO + O^{2-} + 2e^- \rightarrow CO_2$$

$H_2O$ and $CO_2$ generated at the first electrode 12 is exhausted as the power generation exhaust gas from the fuel synthesizing generation apparatus 10 via the power generation exhaust gas passage 34. $H_2O$ contained in the power generation exhaust gas is separated at the $H_2O$ separation unit 35 and stored in the $H_2O$ storage unit 20. $CO_2$ contained in the power generation exhaust gas is separated at the $CO_2$ recovering unit 36 and supplied to the compressor 38 via the $CO_2$ recovering passage 37. The power generation exhaust gas remained after separating $H_2O$ and $CO_2$ is exhausted outside.

$CO_2$ separated at the $CO_2$ recovering unit 36 is compressed at the compressor 38 and supplied to the $CO_2$ storage unit 23. $CO_2$ compressed at the compressor 38 is condensed at the second heat exchanger 39, and heat transfer medium flowing through the second heat transfer medium circuit 40 is heated. The heat transfer medium heated at the second heat exchanger 39 is supplied to the heat utilizing unit 41. The cold generated by compressing $CO_2$ is utilized by the heat utilizing unit 41

Figure 5:
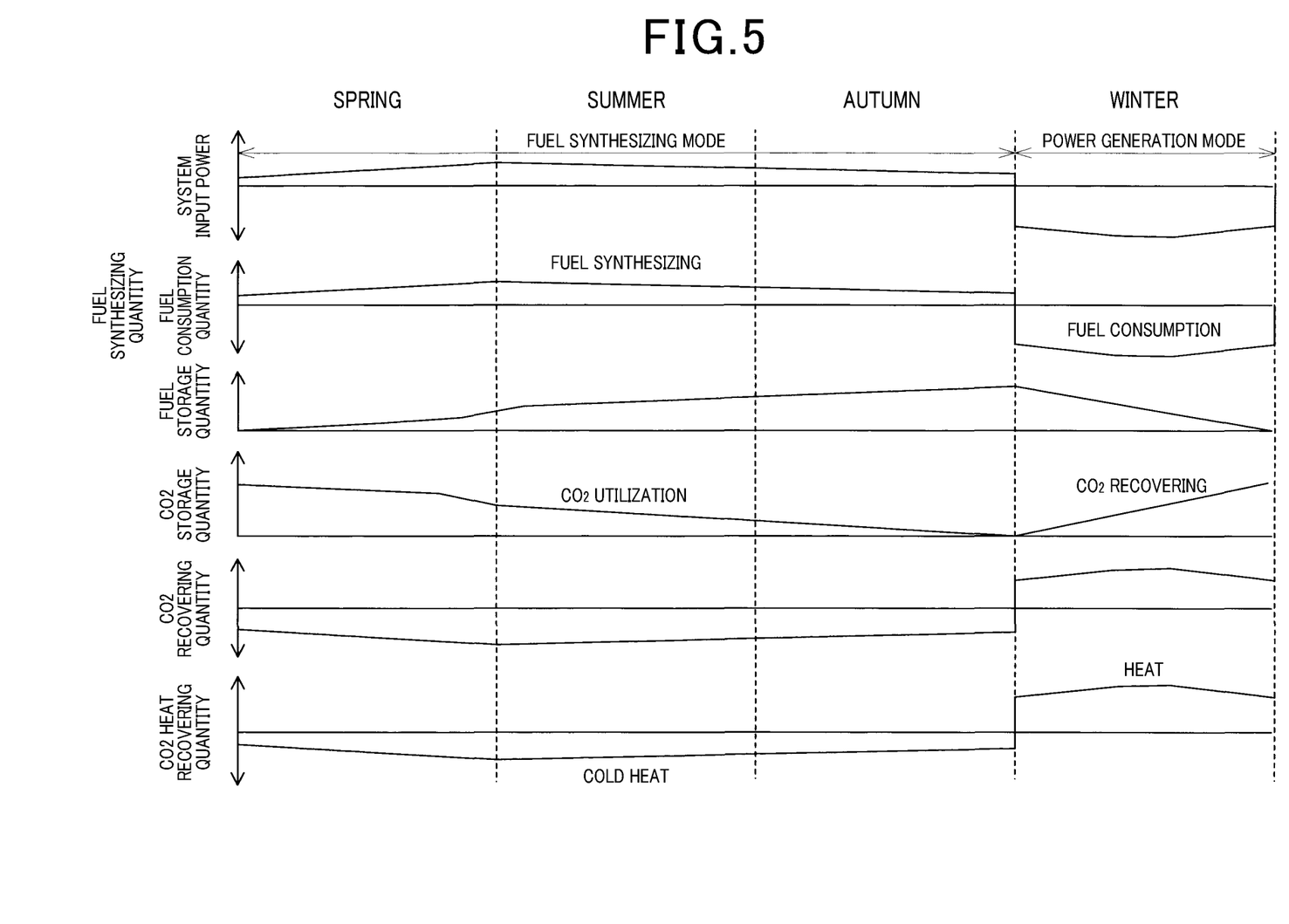
FIG. 5 is a diagram showing relationships between a system input power, a fuel synthesizing quantity/fuel consumption quantity, a fuel storage quantity, a $CO_2$ storage quantity, a $CO_2$ recovery quantity, and a $CO_2$ heat recovery quantity in the energy management system.

Next with reference to FIG. 5, a system input power, a fuel synthesizing quantity and a fuel consumption quantity, a fuel storage quantity, $CO_2$ recovery quantity, $CO_2$ heat recovery quantity of the energy management system will be described.

Since the power supply apparatus 14 according to the present embodiment performs power generation utilizing natural energy, the power generation capability varies depending on the seasons. Hence, as shown in FIG. 5, the energy management system according to the present embodiment changes operation mode between the fuel synthesizing mode and the power generation mode.

In the spring, summer and autumn where the power generation capability of the power supply apparatus 14 becomes large due to abundant sunlight, the fuel synthesizing generation apparatus 10 operates in the fuel synthesizing mode to generate hydrocarbon, and stores the energy as the hydrocarbon. On the other hand, in the winter where the power generation capability utilizing natural energy becomes low and the power consumption of the power-consuming apparatus 15 increases for heating, the fuel synthesizing generation apparatus 10 operates in the power generation mode utilizing the hydrocarbon to perform power generation.

The system input power refers to power supplied to the fuel synthesizing generation apparatus 10 from the power supply apparatus 14 or power supplied to the power-consuming apparatus 15 from the fuel synthesizing generation apparatus 10. The system input power in the spring, the summer and autumn are proportional to the power generation quantity of the power supply apparatus 14, and the system input power in the winter is proportional to the power consumption quantity of the power-consuming apparatus 15.

The fuel generation quantity refers to a quantity of hydrocarbon generated in the fuel synthesizing generation apparatus 10 during the fuel synthesizing mode. The fuel consumption quantity refers to a quantity of hydrocarbon utilized in the fuel synthesizing generation apparatus 10 during the power generation mode. The fuel generation quantity is proportional to the power generation quantity of the power supply apparatus 14. The fuel consumption quantity is proportional to the power consumption quantity.

The fuel storage quantity refers to a storage quantity of hydrocarbon in the fuel storage unit 31. In the fuel synthesizing mode, hydrocarbon is generated, thereby increasing the fuel storage quantity in the fuel storage unit 31. In the power generation mode, hydrocarbon is consumed, thereby reducing the fuel storage quantity of the fuel storage unit 31.

$CO_2$ storage quantity refers to a storage quantity of $CO_2$ in the $CO_2$ storage unit 23. In the fuel synthesizing mode, $CO_2$ storage quantity in the $CO_2$ storage unit 23 decreases because $CO_2$ is used for synthesizing hydrocarbon in the fuel synthesizing generation apparatus 10. In the power generation mode, $CO_2$ storage quantity in the $CO_2$ storage unit 23 increases because of recovering $CO_2$ generated accompanying the power generation in the fuel synthesizing generation apparatus 10.

$CO_2$ recovery quantity refers to $CO_2$ recovery quantity from the fuel synthesizing generation apparatus 10. In the fuel synthesizing mode, the $CO_2$ recovery quantity is on the negative side for using $CO_2$ in the hydrocarbon synthesizing in the fuel synthesizing generation apparatus 10. In the power generation mode, the $CO_2$ recovery quantity is on the positive side for recovering $CO_2$ generated accompanying with the power generation in the fuel synthesizing generation apparatus 10.

The $CO_2$ heat recovery quantity refers to a quantity of heat capable of being recovered from $CO_2$. In the fuel synthesizing mode, since cold heat is generated accompanying evaporation of depressurized $CO_2$, the $CO_2$ heat recovery quantity is in the negative side. In the power generation mode, since heat is generated accompanying with compression of $CO_2$ by the compressor 38, $CO_2$ heat recovery quantity is in positive side.

The above-described energy management system of the present embodiment recovers $CO_2$ from the exhaust gas exhausted from the fuel synthesizing generation apparatus 10 when generating power using hydrocarbon, and recovers heat generated when compressing $CO_2$ to be stored. Thus, heat generated when compressing $CO_2$ can be effectively utilized and the system efficiency can be improved.

Further, the energy management system of the present embodiment recovers cold heat generated when decompressing $CO_2$, when supplying $CO_2$ to the fuel synthesizing generation apparatus 10 for the fuel synthesizing. Thus, cold heat generated when decompressing $CO_2$ can be effectively utilized, and the system efficiency can be improved.

Moreover, the energy management system of the present embodiment compresses $CO_2$ recovered from the power generation exhaust gas to be liquefied and stores the liquefied $CO_2$ into the storage unit 23. Thus, the volume of the recovered $CO_2$ can be significantly lowered, and the storage space for $CO_2$ can be minimized.

The present disclosure is not limited to the above-described embodiments, and may be modified in various manners without departing from the scope of the present disclosure as follows. Further, means disclosed in the above-described respective embodiments may be appropriately combined within an enablement range.

For example, according to the above-described embodiments, methane is exemplified as a hydrocarbon to be synthesized in the fuel synthesizing generation apparatus 10. However, different types of hydrocarbon may be synthesized. In the case where the type of catalyst used for the first electrode 12 and the reaction temperature are differentiated, the types of hydrocarbon to be synthesized can be differentiated. For different types of hydrocarbon, hydrocarbons of which the number of carbon atoms is larger than that of methane such as methane and propane, or hydrocarbons containing oxygen atoms such as alcohols and ethers can be exemplified.

According to the above-described embodiments, a single fuel synthesizing generation apparatus 10 is configured to be switched between the fuel synthesizing apparatus 10a and the power generation apparatus 10b. However, the fuel synthesizing apparatus 10a and the power generation apparatus 10b can be each provided as an independent apparatus.

Further, according to the above-described embodiments, $CO_2$ in a liquid state is stored in the $CO_2$ storage unit 23. However, $CO_2$ in a gaseous state may be contained and at least part of recovered $CO_2$ may be stored in a liquid state.

Also, according to the above-described embodiments, hydrocarbon in a liquid state is stored in the fuel storage unit 31. However, hydrocarbon in a gaseous state may be stored in the fuel storage unit 31.

In the above-described embodiments, heat generated during the operation of the fuel synthesizing generation apparatus 10 may be utilized for a hot-water supply or the like.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

The present disclosure provides an energy management system that improves a system efficiency in which electric energy is utilized to synthesize hydrocarbon, and generates power using the synthesized hydrocarbon.

In order to improve the system efficiency, the energy management system according to the present disclosure is provided with a fuel synthesizing apparatus, a power generation apparatus, a $CO_2$ recovering unit, a compressor, a $CO_2$ storage unit, a $CO_2$ pressure reducing unit and a heat recovery unit. The fuel synthesizing apparatus generates hydrocarbon from $H_2O$ and $CO_2$ using externally supplied power. The power generation apparatus generates power using the hydrocarbon. The $CO_2$ recovering unit recovers $CO_2$ from an exhaust gas exhausted from the power generation apparatus during a power generation. The compressor compresses the recovered $CO_2$. The $CO_2$ storage unit stores the $CO_2$ compressed by the compressor. The $CO_2$ pressure reducing unit depressurizes the $CO_2$ stored in the $CO_2$ storage unit in order to supply the fuel synthesizing apparatus therewith. The heat recovery unit recovers heat from the $CO_2$, the heat being stored in the $CO_2$ when compressed or depressurized.

Thus, heat generated when compressing $CO_2$ or cold heat generated when depressurizing $CO_2$ can be effectively utilized and system efficiency can be improved.

What is claimed is:

1. An energy management system comprising:
  a fuel synthesizing apparatus that generates hydrocarbon by electrolyzing $H_2O$ and $CO_2$ using externally supplied power supplied by a power supply apparatus that generates power utilizing natural energy;
  a power generation apparatus that generates power using the hydrocarbon;
  a $CO_2$ recovering unit that recovers $CO_2$ from an exhaust gas exhausted from the power generation apparatus during power generation;
  a compressor that compresses the $CO_2$ recovered by the $CO_2$ recovering unit;
  a $CO_2$ storage unit that stores the $CO_2$ compressed by the compressor;
  a $CO_2$ pressure reducing unit that depressurizes the $CO_2$ stored in the $CO_2$ storage unit in order to supply the fuel synthesizing apparatus with the $CO_2$ that has been depressurized; and
  a heat recovery unit that recovers heat from the $CO_2$, the heat being stored in the $CO_2$ when compressed by the compressor or depressurized by the $CO_2$ pressure reducing unit, the heat recovery unit including (1) a first heat exchanger located between the compressor and the $CO_2$ storage unit and being configured to recover heat generated when compressing the $CO_2$ by the compressor and (2) a second heat exchanger located downstream of the $CO_2$ storage unit and the $CO_2$ pressure reducing unit and being configured to recover cold heat generated when depressurizing $CO_2$ by the $CO_2$ pressure reducing unit, wherein
  the fuel synthesizing apparatus and the power generation apparatus are configured of a single fuel-synthesizing generation apparatus capable of switching between (i) a synthesizing operation of the hydrocarbon using the externally supplied power supplied by the power supply apparatus and (ii) a power generation operation by the power generation apparatus using the hydrocarbon, and
  the energy management system switches an operation mode between the synthesizing operation and the power generation operation, depending on: (a) a power generation capability of the power supply apparatus that supplies the power to the fuel-synthesizing generation apparatus and (b) a power consumption of a power-consuming apparatus to which the power generation apparatus outputs the power that is generated.

2. The energy management system according to claim 1, wherein at least a part of the $CO_2$ stored in the $CO_2$ storage unit is in a liquid state.

3. The energy management system according to claim 1, wherein
  the heat recovered by the first heat exchanger is utilized by a heat utilizing unit.

4. The energy management system according to claim 3, wherein
  the heat utilizing unit is configured to heat air used for an indoor air-conditioning unit with the heat recovered by the first heat exchanger.

5. The energy management system according to claim 3, wherein
  the heat utilizing unit is configured to heat water with the heat recovered by the first heat exchanger, thereby generating hot water.

6. The energy management system according to claim 3, wherein
  the heat utilizing unit is configured to heat $H_2O$ to be supplied to the fuel synthesizing apparatus with the heat recovered by the first heat exchanger.

7. The energy management system according to claim 3, wherein
  the heat utilizing unit is configured to heat the fuel synthesizing apparatus or the power generation apparatus with the heat recovered by the first heat exchanger.

8. The energy management system according to claim 1, wherein
  the cold heat recovered by the second heat recovery unit exchanger is utilized by a cold utilizing unit.

9. The energy management system according to claim 1, wherein
  the fuel-synthesizing generation apparatus is provided with an electrolyte and a pair of electrodes provided at both sides of the electrolyte; and
  the pair of electrodes are configured such that functions of the pair of electrodes are switched between an anode and a cathode depending on whether the fuel-synthesizing generation apparatus operates as the fuel synthesizing apparatus or as the power generation apparatus.

* * * * *